United States Patent [19]

Cutlip et al.

[11] 4,290,048
[45] Sep. 15, 1981

[54] TURN SIGNALLING APPARATUS

[76] Inventors: David S. Cutlip; Judyth Cutlip, both of 179 Candlewood Path, Dix Hills, N.Y. 11746

[21] Appl. No.: 156,836

[22] Filed: Jun. 5, 1980

[51] Int. Cl.³ ............................ B62J 3/00; B60Q 1/34
[52] U.S. Cl. ...................................... 340/134; 340/67; 340/73; 340/74; 315/200 A
[58] Field of Search ................... 340/134, 66, 67, 73, 340/74, 78, 81 R, 83, 84, 87, 94, 331, 332; 200/61.27, 61.12; 362/72; 315/200; 307/10 LS

[56] References Cited

U.S. PATENT DOCUMENTS

| | | | |
|---|---|---|---|
| 3,484,743 | 12/1969 | Stancil et al. | 340/82 |
| 4,020,458 | 4/1977 | Windisch | 340/134 |
| 4,037,195 | 7/1977 | Woislawowicz | 340/81 F |
| 4,204,191 | 5/1980 | Daniels | 340/134 |

OTHER PUBLICATIONS

"Richards Bicycle Book" Richard Ballantine, 1978.

*Primary Examiner*—Thomas A. Robinson
*Assistant Examiner*—Donnie L. Crosland
*Attorney, Agent, or Firm*—Ladas & Parry

[57] ABSTRACT

A vehicle turn signalling apparatus unambiguously signals the direction of a turn by a simultaneous initiation of energization of a right-turn indicator lamp and a left-turn lamp, one in a flashing mode of illumination to signal the turn direction, the other in a steady mode of illumination to provide a positional reference for the flashing lamp. Such provision permits close spacing of the turn indicator lamps from one another, and thus renders the apparatus particularly well-suited for use on bicycles and mopeds.

13 Claims, 3 Drawing Figures

TURN SIGNALLING APPARATUS

BACKGROUND OF THE INVENTION

This invention relates to vehicle turn signalling apparatus by which the direction of a turn is signalled by a corresponding flashing lamp.

Heretofore, such turn signalling apparatus has generally employed widely-spaced left-turn and right-turn signalling lamps at the rear of an automobile, truck or trailer and has been used at night in conjunction with steadily illuminated, similarly-spaced left and right tail lamps. Thus, for example, when the left-turn signalling lamp is flashed, the steadily illuminated right tail lamp provides a reference which enables the driver of a following vehicle one-hundred feet away to discern that the flashing lamp he observes is the left-turn signalling lamp.

In the case of motorcycles, left-turn and right-turn signalling lamps are conventionally mounted at the ends of a horizontal transverse bar nearly two feet apart; and a single tail lamp centrally located between the turn signalling lamps will, when turned on by a switch independent of the turn signal switch, provide a reference enabling a following driver to discern at a considerable distance which one of the two signalling lamps on the motorcycle is flashing when the motorcycle is signalling a turn.

Each prior art apparatus mentioned above requires the vehicle driver to switch on a tail lamp (or lamps) in an operation separate from his operation of the turn signal switch; and, unless the tail lamp (or lamps) is switched on, there will be no steadily illuminated reference position enabling a distant following driver to determine in the dark the relative position of the flashing signal lamp selected by operation of the turn signal switch.

The need for a steadily illuminated reference position to ascertain the position of flashing illumination, hence the need for respective switching operations independent of one another, has been circumvented heretofore at the rear of a motorcycle by arranging four lamps in a horizontal transverse bank of adjoining compartments behind a common red lens and operating a turn signal switch to energize the lamps in a repeating sequence from left to right for a right turn and from right to left for a left turn, as disclosed in U.S. Pat. No. 3,484,743 granted Dec. 16, 1969. A tail lamp (or lamps), however, is still required for safe vehicle operation after dark, albeit not to provide a reference position (or positions). Thus, the sequential flash technique adds more signal lamps to a vehicle turn signalling apparatus. It also significantly increases the complexity and cost of such apparatus.

As far as pedal-operated bicycles and mopeds are concerned, there has heretofore been provided a turn signalling apparatus consisting of a small unit about 5" across, installed at the back of the biker's seat and provided with respective lamps behind right and left arrows of clear red plastic. A battery-powered electrical circuit arrangement in the unit, under control of a finger-operated handle-bar switch, selectively illuminates either the lamp behind the right arrow or the lamp behind the left arrow or neither lamp. At a distance of about 20 feet or more, however, all one can see when the biker signals a turn is a steady red light spot. No arrow outline is discernible at this distance and hence the direction of the turn is undetectable by the driver of an approaching automobile and, indeed, the driver might well interpret the red light spot as a stop or braking signal and begin to pass the bicycle on the side towards which the biker is about to turn.

Another known turn signalling apparatus for pedal-operated bicycles or mopeds consists of a larger unit about 10" across for installation at the back of the biker's seat. This known unit is provided with three lamps, two independently-operated mutually-remote switches and a battery. One of the lamps is behind a large red plastic lens flanked on its right and left sides by respective ones of the other lamps, each being behind a smaller red plastic lens. One of the switches is mounted on the unit and is manually operable to turn the central lamp on and off for tail light purposes. The other switch is to be mounted on the handle-bar and is manually operable to selectively energize either side lamp alone for signalling a corresponding turn direction or to deenergize both lamps entirely. Each side lamp is a blinker bulb having a bi-metallic filament which takes from 5 to 10 seconds to heat up and become active. Thus, a biker could be well into a turn before the selectively energized side lamp begins to flash. And, if the biker has not independently switched the centrally-located tail light on, an observer at a distance behind the bicycle or moped may not be able to detect which side lamp is flashing.

The aforementioned known systems specifically designed for use on pedal-operated bicycles and mopeds are accordingly highly deficient in providing the signalling function they purport to provide. Such a deficiency is fast becoming an extremely serious matter in view of the rapidly accelerating use of bicycles to avoid the high cost of gasoline, diesel oil and other fuels for engine-driven vehicles.

SUMMARY OF THE INVENTION

An object of this invention is to provide an improved, compact, power conserving and relatively inexpensive turn indicator lamp system.

Another object of this invention is to provide a turn indicator lamp system in which an unambiguous signalling of turn direction is produced notwithstanding several inches spacing between right and left turn indicator lamps of the system.

A further object of this invention is to provide a turn indicator lamp system having a right turn indicator lamp and a left turn indicator lamp, wherein an indication of a right or left turn is signalled by simultaneously initiating a flashing of the corresponding turn indicator lamp and a steady illumination of the other turn indicator lamp.

A still further object of this invention is to provide a turn indicator lamp system in which, by selective manipulation of a single multiple contact switching device, either one of a flashable right turn indicator lamp and a flashable left turn indicator lamp is switched on to a steady state of illumination simultaneously with the other being switched on to a flashing state of illumination, whereby the steadily illuminated lamp serves as a positional reference for the flashing lamp.

An additional object of this invention is to provide a turn indicator lamp system which includes a semiconductor timer chip which times the operation of a mini-micro relay to cause a selected one of a right turn indicator lamp and a left turn indicator lamp to flash immediately upon initiation of a steady illumination of the other lamp in response to the selection of the flashing lamp.

A turn signalling apparatus constructed in accordance with the invention is especially suitable for use on pedal-operated bicycles, including those that are motor-assisted, i.e. mopeds. However, it is to be understood that the use of such apparatus is not so limited, but that it extends to virtually any other type of steerable vehicle, whether land, sea or air, in which an unambiguous, easily-read directional signalling of a turn is desired.

In the preferred embodiment of this invention, the turn indicator lamp system is adapted for use on a pedal-operated bicycle. The system comprises a finger-operated switch having a neutral position, a right turn position and a left turn position, which switch is to be mounted on the handle-bars of the bicycle. The system further comprises an integrated unit connected by an electrical cable with the handle-bar switch and arranged to be mounted behind and slightly below the seat of the bicycle. The integrated unit has a central rectangular housing which extends horizontally athwart the bicycle and which contains a power pack of dry cell batteries and electrical circuitry controlled by the handle-bar switch. A hollow block of clear red plastic is fixed to each end of the central rectangular housing, each block containing a turn indicator lamp whose illumination is controlled by the handle-bar switch and the circuitry within the central housing. Upon operation of the handle-bar switch to its right turn position, the circuitry immediately causes the turn indicator lamp in the right-hand block of the unit, as seen from the rear of the bicycle, to flash and the turn indicator lamp in the left-hand block to become steadily illuminated. Similarly, upon operation of the handle-bar switch to its left turn position, the circuitry immediately causes the turn indicator lamp in the left-hand block to flash and the turn indicator lamp in the right-hand block to become steadily illuminated. In the neutral position of the handle-bar switch, both turn indicator lamps are steadily deenergized.

BRIEF DESCRIPTION OF THE DRAWINGS

In order that the invention may be more fully understood, it will be described with reference to the accompanying drawings, in which.

DETAILED DESCRIPTION OF THE INVENTION

Figure 3:
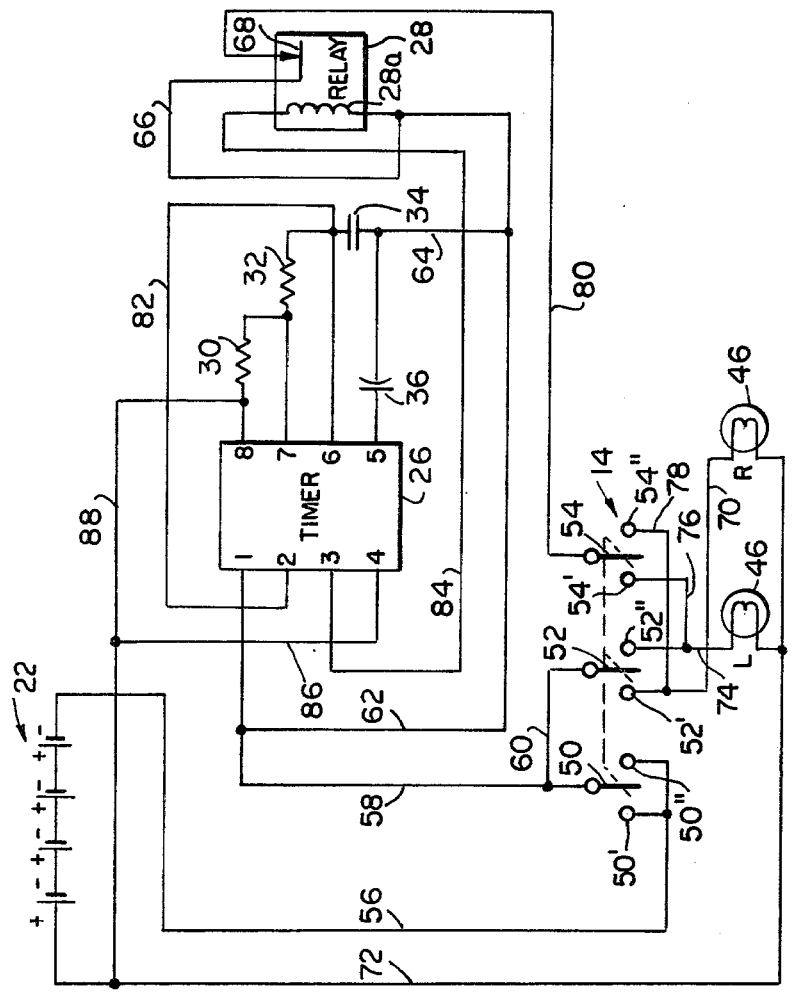
FIG. 3 is a schematic wiring diagram of the electrical circuitry employed by the apparatus.
Figure 1:
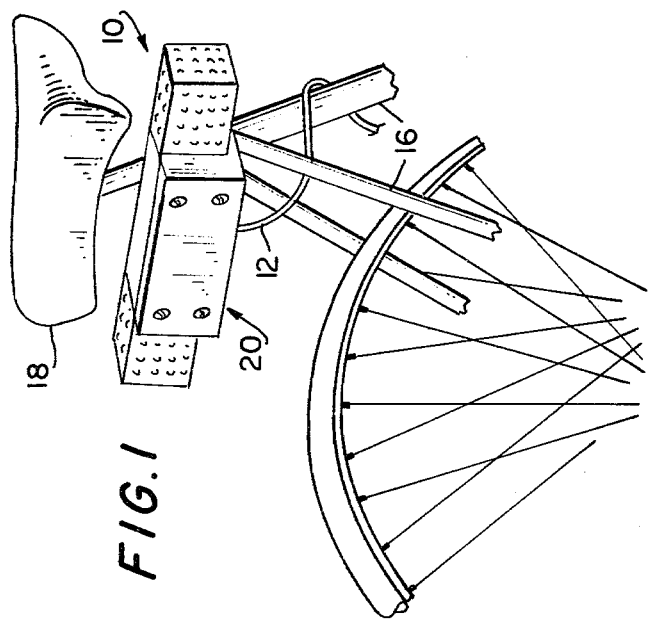
FIG. 1 is a fragmentary view of the rear portion of a bicycle showing, except for its control switch, a turn signalling apparatus embodying the invention mounted directly below and behind the biker's seat.
Figure 2:
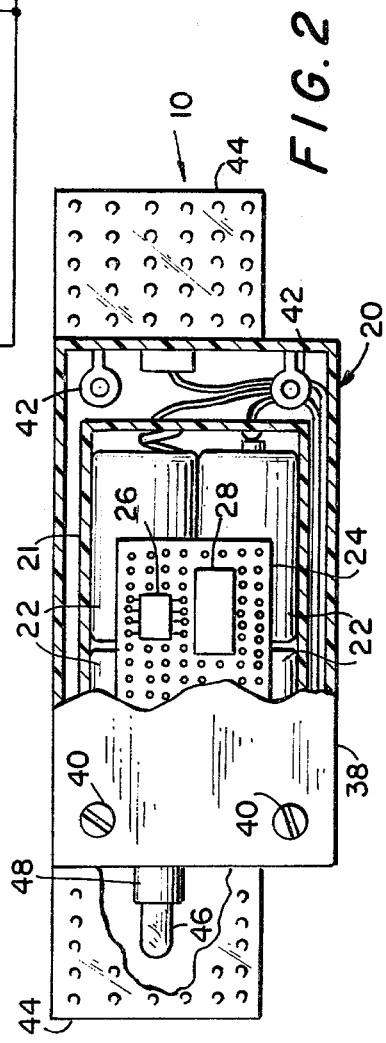
FIG. 2 is a cut-away view in front elevation of the apparatus portion depicted in FIG. 1 showing the left-turn signal lamp and the circuit board and dry cells within the central housing.

Referring to FIG. 1, an integrated unit 10 connected by an electrical cable 12 to a handle-bar switch 14 (FIG. 3) is mounted to the frame members 16 of a bicycle by a suitable bracket (not shown) so as to reside directly below and behind the biker's seat 18. Integrated unit 10 has a central rectangular housing 20 extending horizontally athwart the bicycle and, as indicated in FIG. 2, contains a power pack 21 of four dry cell batteries 22 and a circuit board 24 having a timer 26 and a relay 28 mounted thereon together with associated resistors 30,32 and capacitors 34,36 which are shown in FIG. 3. The interior of housing 20 is rendered accessible by a removable cover 38 held in place by screws 40 which threadably engage holes in respective corner posts 42 underlying cover 38 and projecting towards the cover from the bottom of housing 20.

Removably attached to each end of housing 20 by any suitable means (not shown) is a hollow rectangular block 44 made of lenticular red plastic. A 6-volt turn indicator lamp 46 and a socket 48 therefor projects into each block 44 from a respective end of housing 20. The state of each lamp 46, i.e. whether it is non-illuminated, steadily-illuminated or flashing, is controlled by handle-bar switch 14 in conjunction with the electrical circuitry whose components 26,28,30,32, 34 and 36 are interconnected as shown in FIG. 3 and are mounted upon circuit board 24 depicted in FIG. 2.

The operation of the turn signalling apparatus will now be described in detail with reference to FIG. 3. There it will be seen that handle-bar switch 14 is a conventional triple-pole, double-throw snap switch having a first movable contact 50, a second movable contact 52 and a third movable contact 54, all ganged together to move in unison from respective neutral positions (in which they are shown) to either a left-hand position or a right-hand position. Such unitary movements are effected in a conventional manner by a finger-operated lever (not shown), and it is contemplated that switch 14 would be mounted on the bicycle handle-bars so that the direction of movement of the finger-operated lever corresponds to the direction of the turn to be signalled.

In its left-hand position, movable contact 50 engages a fixed contact 50′ and, in its right-hand position, engages a fixed contact 50″. Similarly, in their left-hand positions, movable contacts 52 and 54 engage fixed contacts 52′ and 54′ respectively and, in their right-hand positions, engage fixed contacts 52″ and 54″ respectively.

Fixed contacts 50′, 50″ are connected by a conductor 56 to the negative terminal of battery 22. Movable contact 50 is connected by a conductor 58 to a numbered terminal 1 of timer 26. Further connections are respectively made from conductor 58 by a conductor 60 to movable contact 52 and by a conductor 62 to one side of an operating coil 28a of relay 28. Still further connections are respectively made from conductor 62 by a conductor 64 to one side of each of capacitors 34 and 36 and by a conductor 66 to one of a pair 68 of coil-operated contacts of relay 28.

Fixed contact 52′ is connected by a conductor 70 to one side of right-turn signalling lamp 46, the other side of which is connected by a conductor 72 to the positive terminal of battery 22. Fixed contact 52″ is connected by a conductor 74 to one side of left-turn signalling lamp 46, the other side of which is connected to conductor 72.

Fixed contact 54′ is connected by a conductor 76 to conductor 74, whereas fixed contact 54″ is connected by a conductor 78 to conductor 70. Movable contact 54 is connected by a conductor 80 to the other contact of contact pair 68 of relay 28.

A numbered terminal 2 of timer 26 is connected by a conductor 82 to a numbered terminal 6 of timer 26. A numbered terminal 3 of timer 26 is connected by a conductor 84 to the other side of relay coil 28a. A numbered terminal 4 of timer 26 is connected by a conductor 86 to a conductor 88 which provides a connection between conductor 72 and a numbered terminal 8 of timer 26. Resistor 30 is connected between numbered terminal 8 and a numbered terminal 7 of timer 26, whereas resistor 32 is connected between numbered terminal 7 and conductor 82 at numbered terminal 6 of timer 26. The other side of capacitor 36 is connected to a numbered terminal 5 of timer 26.

Timer 26 is a standard off-the-shelf part known in the art as a "555" timer and consists of a semiconductor chip readily available in the U.S.A., for example, at the "Radio Shack" chain of retail electronic parts supply stores under the designation "XC NE 555P" and Part No. 927.

The positive side of battery 22 is connected at all times to timer 26 at its numbered terminal 4 via conductors 86 and 88, at its numbered terminal 8 via conductor 88, at its numbered terminal 7 via conductor 88 and resistor 30, at its numbered terminal 6 via conductor 88, resistor 30 and resistor 32, and at its numbered terminal 2 via conductor 88, resistor 30, resistor 32 and conductor 82. The negative side of battery 22 is only connected to timer 26 when movable contact 50 engages fixed contact 50' (for signalling a left turn) or engages fixed contact 50" (for signalling a right turn), the connection being made in each instance at numbered terminal 1 of timer 26 via conductor 58 and conductor 56. Thus, timer 26 is supplied with power from battery 22 only when a turn is signalled.

Leftward movement of movable contact 52 to engage fixed contact 52' connects the negative side of battery 22 via conductor 60, engaged contacts 50,50' and conductor 56 to one terminal of the right signal lamp 46, the other terminal of which is connected at all times to the positive side of battery 22 via conductor 72, thereby steadily illuminating the right signal lamp 46 when a left turn is signalled.

The simultaneous leftward movement of movable contact 54 to engage fixed contact 54' connects one terminal of the left signal lamp 46 via conductor 76, conductor 80, relay contacts 68, conductor 66, conductor 62, conductor 58, engaged contacts 50,50' and conductor 56 to the negative side of battery 22, the positive side of which is at all times connected via conductor 72 to the other terminal of the left signal lamp 46. Relay contacts 68 rapidly open and close in response to pulses supplied through relay coil 28a from numbered terminal 3 of timer 26 via conductor 84, thereby causing the left signal lamp 46 to flash.

Relay 28 is preferably a standard off-the-shelf part known in the art as a "mini-micro relay" and is made, for example, by ITT under Part No. RZ-5 and rated at 125-volts, 150 ma.

Rightward movement of movable contact 52 to engage fixed contact 52" connects the negative side of battery 22 via conductor 60, engaged contacts 50,50" and conductor 56 to one terminal of the left signal lamp 46, the other terminal of which is connected at all times to the positive side of battery 22 via conductor 72, thereby steadily illuminating the left signal lamp 46 when a right turn is signalled.

The simultaneous rightward movement of movable contact 54 to engage fixed contact 54" connects one terminal of the right signal lamp 46 via conductor 70, conductor 78, conductor 80, relay contacts 68, conductor 66, conductor 62, conductor 58, engaged contacts 50,50" and conductor 56 to the negative side of battery 22, the positive side of which is at all times connected via conductor 72 to the other terminal of the right signal lamp 46. Relay contacts 68 rapidly open and close in response to pulses supplied through relay coil 28a from numbered terminal 3 of timer 26 via conductor 84, thereby causing the right signal lamp 46 to flash.

Resistor 30 is preferably a 10,000 ohm resistor and resistor 32 is preferably a 22,000 ohm resistor, these values having been found to provide timer 26 with a timed pulse output to relay coil 28a ideally suited for the flashing of the signal lamps 46. Capacitor 34 is preferably of a 10 microfarad value and capacitor 36 is preferably of a 0.01 microfarad value, both capacitors serving a d.c. blocking function. Switch 14 is a standard "off-the-shelf" part and may, for example, be the "on-off-on" switch made in the U.S.A. by J-B-T and sold by Allied Electronics under Stock No. 826-1421.

The overall length of integrated unit 10 is preferably about eight inches (20.3 cm.), and signal lamps 46 are preferably spaced about six inches (15.2 cm.) apart. We have found that, at dawn and dusk, a clear, unambiguous turn signal indication from a so-dimensioned unit 10 is visible at a distance of 500 feet. Intensity of illumination is not the major factor in this respect; it is the simultaneous initiation of flashing illumination of one turn signal lamp and steady reference illumination of the other turn signal lamp which accounts for the long range clarity and unambiguity. Greater illumination intensity, however, may be readily provided within the purview of the invention without increasing the size of unit 10 by replacing the 6-volt incandescent lamps 46 with high-intensity LED's that have recently become commercially available. Other modifications of the embodiment of the turn signalling apparatus described herein may be made by those skilled in the art without departing from the scope of our invention as defined in the appended claims.

What is claimed is:

1. A vehicle turn signalling apparatus, comprising:
   (a) a right-turn signalling lamp;
   (b) a left-turn signalling lamp; and
   (c) means for simultaneously initiating a flashing illumination of either one of said signalling lamps and a steady illumination of the other signalling lamp.

2. Apparatus according to claim 1, wherein said means include a multiple-contact turn signal switch selectively operable to a neutral setting at which neither lamp is illuminated, a right turn setting at which the right-turn signalling lamp is given a flashing illumination and the left-turn signalling lamp is given a steady illumination, and a left turn setting at which the left-turn signalling lamp is given a flashing illumination and the right-turn signalling lamp is given a steady illumination.

3. Apparatus according to claim 2, wherein said means include a power source, a timer connectable to said power source by said turn signal switch at the right turn and left turn settings thereof for providing a train of output pulses, and a relay connected to the output of said timer and to said power source, said relay being responsive to said output pulses for connecting and disconnecting from said power source, in synchronism with said pulses, the turn signalling lamp corresponding to the turn setting of said turn signal switch.

4. Apparatus according to claim 3, wherein said power source, said timer and said relay are enclosed within an elongated housing, from each end of which projects a respective one of said turn signalling lamps enclosed in a hollow block of lenticular material attached to said housing, said housing and blocks forming an integrated unit.

5. Apparatus according to claim 4, wherein said turn signal switch is remotely located from said integrated unit and is electrically connected by cable to said power source, said timer and said relay.

6. Apparatus according to claim 5, wherein said power source comprises a plurality of dry-cell batteries arranged as a power pack within said housing.

7. Apparatus according to claim 2, wherein said multiple-contact turn signal switch comprises a first movable contact associated with a first pair of fixed contacts, a second movable contact associated with a second pair of fixed contacts, and a third movable contact associated with a third pair of fixed contacts, said movable contacts being ganged together for movement in unison, said neutral setting of the switch occurring when each movable contact is disengaged from each of its associated fixed contacts, said right turn setting occurring when each movable contact is engaged with one of its associated fixed contacts, said left turn setting occurring when each movable contact is engaged with its other associated fixed contact.

8. Apparatus according to claim 7, wherein said first movable contact and associated contacts control the activation of the apparatus by the power source, said second movable contact and associated contacts control the steady illumination of the signalling lamps, and said third movable contact and associated contacts control the flashing illumination of said lamps.

9. Apparatus according to claim 5, wherein said timer comprises a semiconductor chip and said relay comprises a mini-micro relay, said timer and relay being mounted within said housing on a printed circuit board from which electrical connections are made by way of said cable to said remotely located turn signal switch.

10. Apparatus according to claim 1, wherein said right-turn signalling lamp and left-turn signalling lamp are spaced apart from about 5 to 7 inches and, in use, are mounted on the frame of a bicycle in horizontal alignment athwart said bicycle closely behind and below the bicycle seat.

11. Apparatus according to claim 10, wherein said lamps are disposed at the opposite ends of a rectangular housing which occupies the space between said lamps; and wherein said initiating means comprises a turn signal switch which, in use, is mounted on the handle-bars of said bicycle, said initiating means further comprising electronic circuitry, including a power source, which is mounted within said housing and electrically connected by cable to said switch, said circuitry being controlled by said switch to selectively control the flashing illumination and steady illumination of said lamps.

12. Apparatus according to claim 10, wherein said lamps are of the incandescent type and are mounted in respective hollow enclosures formed of light-transmitting colored sheet material having retro-reflective properties.

13. Apparatus according to claim 12, wherein a central housing for components of said initiating means supports said light-transmitting hollow enclosures at opposite ends thereof and is formed of opaque, light-absorbing material.

* * * * *